United States Patent
Merritt et al.

(10) Patent No.: US 11,285,423 B2
(45) Date of Patent: *Mar. 29, 2022

(54) FILTER MEDIA AND FILTER ELEMENT WITH ADHESIVE REINFORCING

(71) Applicant: Baldwin Filters, Inc., Cleveland, OH (US)

(72) Inventors: Steven J. Merritt, Kearney, NE (US); Timothy L. Krull, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/743,938

(22) Filed: Jan. 15, 2020

(65) Prior Publication Data

US 2020/0147540 A1    May 14, 2020

Related U.S. Application Data

(63) Continuation of application No. 15/795,573, filed on Oct. 27, 2017, now Pat. No. 10,569,211, which is a
(Continued)

(51) Int. Cl.
*B01D 46/52* (2006.01)
*B01D 39/16* (2006.01)
*B01D 46/00* (2006.01)

(52) U.S. Cl.
CPC ........... *B01D 46/525* (2013.01); *B01D 39/16* (2013.01); *B01D 46/0001* (2013.01);
(Continued)

(58) Field of Classification Search
CPC ...... B01D 46/525–527; B01D 2275/50; B01D 46/0001; B01D 2271/022; B01D 2239/0464
See application file for complete search history.

(56) References Cited

U.S. PATENT DOCUMENTS 5,820,646 A    10/1998   Gillingham et al.
6,156,089 A *  12/2000   Stemmer ............ B01D 46/0036
                                                   55/467
(Continued)

FOREIGN PATENT DOCUMENTS

CN    1456384       11/2003
EP    1996309 A2    12/2008
(Continued)

OTHER PUBLICATIONS

U.S. Appl. No. 15/795,573, filed Oct. 27, 2017.

*Primary Examiner* — Robert Clemente
(74) *Attorney, Agent, or Firm* — Reinhart Boerner Van Deuren P.C.

(57) ABSTRACT

A method of reinforcing a filter media pack as well as a reinforced media pack is provided. The method includes forming a media pack to have an inlet face and an outlet face. The method includes applying a reinforcing agent to the media pack. The reinforcing agent is applied in a flowable state. The method also includes hardening the reinforcing agent to form a reinforcing structure to reinforce the media pack. Filter element having such a reinforcing structure is also provided.

26 Claims, 13 Drawing Sheets

Related U.S. Application Data continuation of application No. 15/439,580, filed on Feb. 22, 2017, now Pat. No. 9,827,527, which is a continuation of application No. PCT/US2015/054739, filed on Oct. 8, 2015.

(60) Provisional application No. 62/062,516, filed on Oct. 10, 2014.

(52) U.S. Cl.
CPC .... B01D 46/527 (2013.01); *B01D 2239/0464* (2013.01); *B01D 2271/022* (2013.01); *B01D 2275/50* (2013.01)

(56) References Cited

U.S. PATENT DOCUMENTS

| | | | |
|---|---|---|---|
| 6,171,354 B1 * | 1/2001 | Johnson | B01D 46/10 55/309 |
| 9,827,527 B2 | 11/2017 | Merritt et al. | |
| 2003/0042196 A1 | 3/2003 | Leibold et al. | |
| 2006/0091066 A1 | 5/2006 | Driml et al. | |
| 2006/0151655 A1 | 7/2006 | Johnston | |
| 2007/0169449 A1 * | 7/2007 | Merritt | B01D 46/527 55/486 |
| 2007/0186528 A1 | 8/2007 | Wydeven et al. | |
| 2008/0135471 A1 | 6/2008 | Merritt et al. | |
| 2010/0011725 A1 * | 1/2010 | Babb | B01D 25/001 55/500 |
| 2012/0317944 A1 * | 12/2012 | Lise | B01D 46/0001 55/499 |
| 2014/0014572 A1 | 1/2014 | Mbadinga-Mouanda et al. | |
| 2016/0067648 A1 * | 3/2016 | Unger | B01D 46/0036 95/90 |

FOREIGN PATENT DOCUMENTS

| | | |
|---|---|---|
| GB | 1600374 A | 10/1981 |
| JP | S61 50612 A | 3/1986 |

* cited by examiner

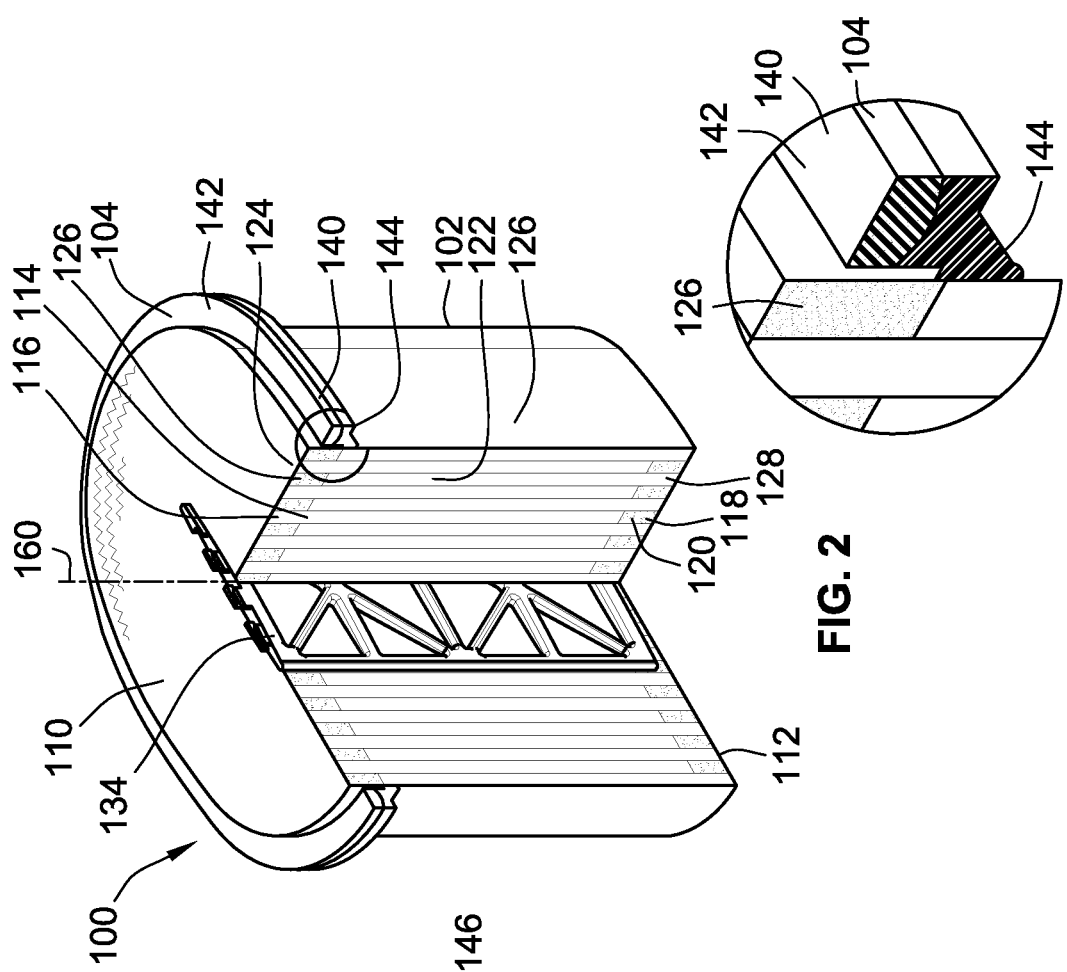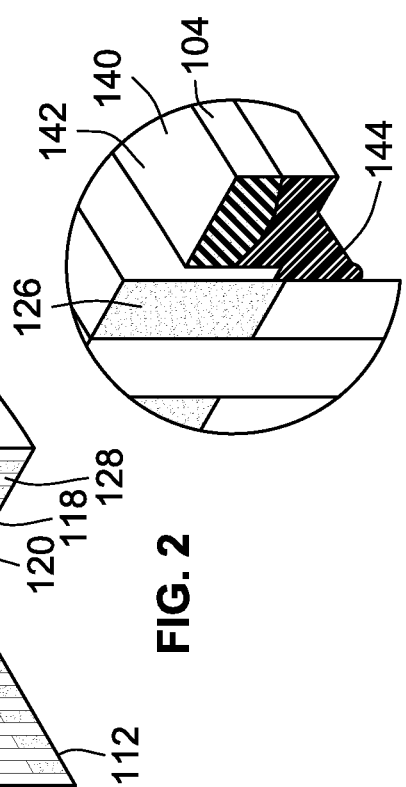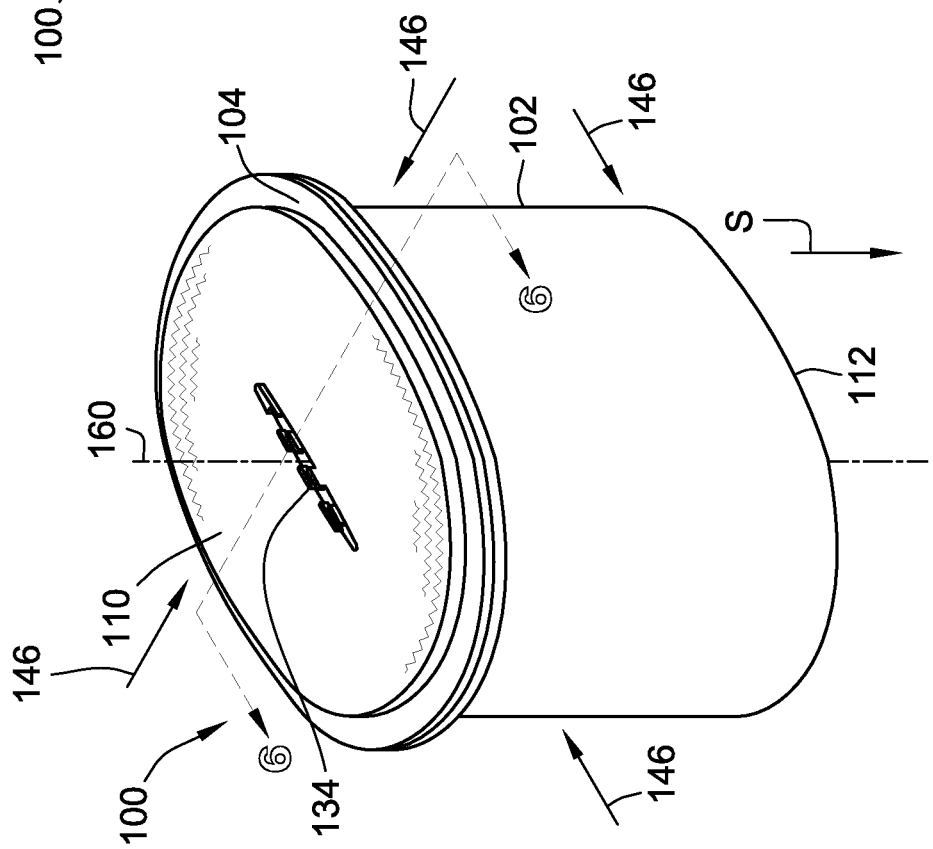

FIG. 10
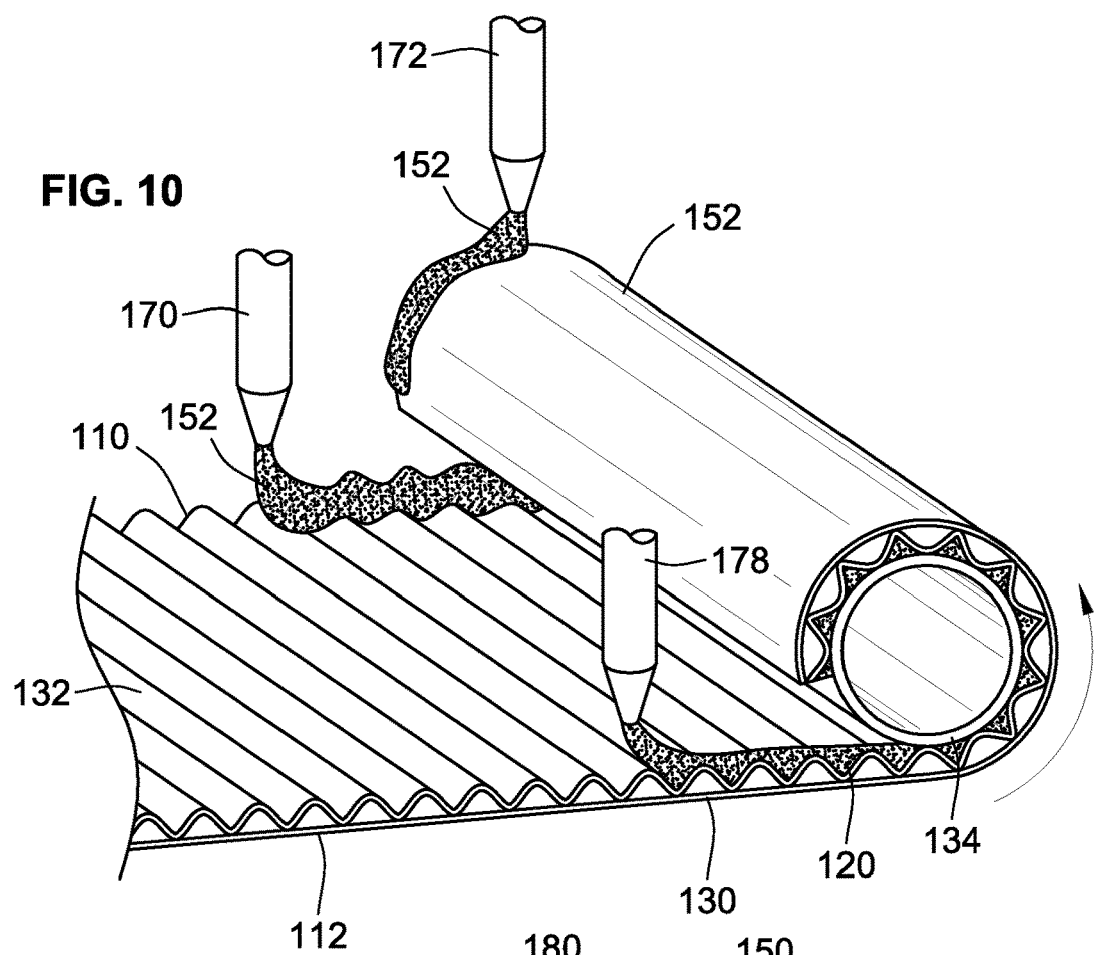
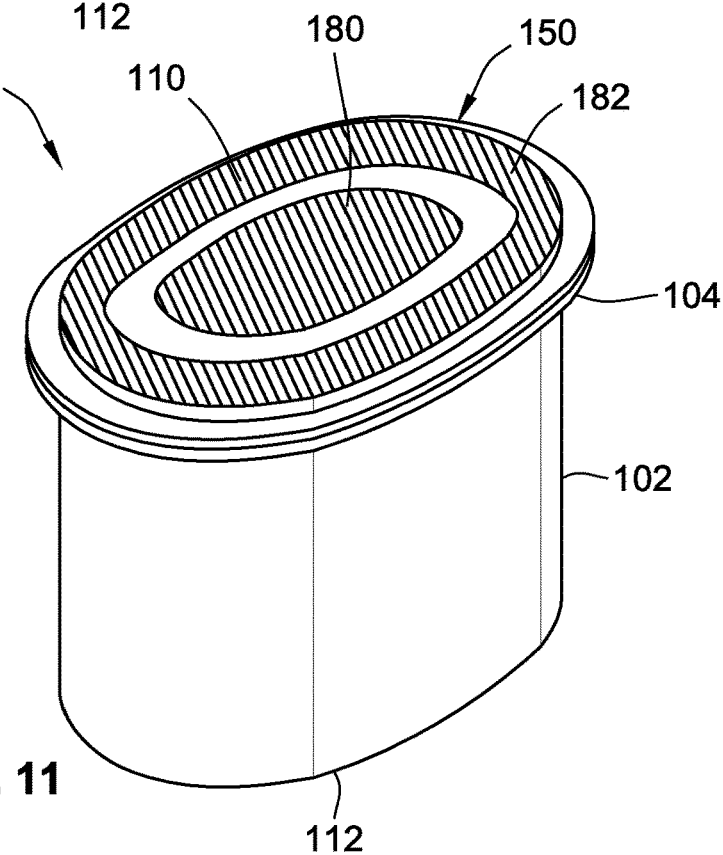
FIG. 11

FILTER MEDIA AND FILTER ELEMENT WITH ADHESIVE REINFORCING

CROSS-REFERENCE TO RELATED PATENT APPLICATIONS

This patent application is a continuation of co-pending U.S. patent application Ser. No. 15/795,573, filed Oct. 27, 2017, which is a continuation of U.S. patent application Ser. No. 15/439,580, filed Feb. 22, 2017, now U.S. Pat. No. 9,827,527, issued Nov. 28, 2017, which is a continuation of PCT/US2015/054739, filed Oct. 8, 2015, designating the United States, which claims the benefit of U.S. Provisional Patent Application No. 62/062,516, filed Oct. 10, 2014, the entire teachings and disclosure of which are incorporated herein by reference thereto.

FIELD OF THE INVENTION

This invention generally relates to filter media and filter elements and particularly to filter elements that include reinforcing structures for reinforcing the filter media of the filter element.

BACKGROUND OF THE INVENTION

Filters are used to remove impurities from a flow of fluid such as a liquid or a gas. The filter will typically include porous filter media that traps the impurities as the fluid flows through the filter media.

One particular type of media is a fluted type media that is formed from a plurality of adjacent layers of filter media. The layers define a plurality of flutes that form either inlet or outlet flutes depending on which flutes are open at an inlet side and closed at the outlet side or closed at the inlet side and open on the outlet side of the filter. Typically, the layers of media are formed from a facer sheet secured to a corrugated or fluted sheet. This composite structure can then be wound to form a plurality of adjacent layers from a single continuous strip or can be cut into segments and then stacked to form a plurality of adjacent layers.

A seal arrangement is also typically attached to the filter media to releasably seal the filter media within a housing. This seal can be a radially directed seal or an axially directed seal. Typically, the seal is a relatively soft and compliant material so that it forms a good fluid tight seal with a corresponding surface of the housing. The seal arrangement is typically attached to an outer peripheral surface of the media.

A pressure differential will exist across the filter media to force the fluid to flow through the media. In many systems, the pressure differential is generated by a vacuum on a downstream side of the filter media. A vacuum across the media presents several problems, particularly with regard to the layered fluted type media.

This vacuum can cause radially inwardly directed compression of the filter media reducing the size of the outer periphery of the media. This reduction in size can cause several problems. This can cause the compliant seal to be drawn radially inward as well. If the seal is a radially directed seal, this can cause the seal to disengage from the housing sealing surface and create a leak path or, at a minimum, reduce the quality of the seal between the seal arrangement and housing.

Further, if the seal is an axial seal, the seal arrangement is often axially pinched between portions of the housing. When the filter media reduces in size while the seal is held firm between portions of the housing, this can cause the connection between the seal arrangement and media to become destroyed. Alternatively, it can cause the layers of the filter media to separate. Either of these problems can create undesirable leak paths.

A further problem particularly related to fluted media is that the pressure differential across the filter media can cause the adjacent layers to slip relative to one another, which is often referred as telescoping. This telescoping of the media can also create leak paths. Further, when the layers telescope, the problems relating to vacuum discussed above can be exacerbated.

Another type of media is pleated media that is typically a single continuous piece of filter media that is folded to form a plurality of adjacent panels interconnected by the folds. The interconnected panels form a plurality of peaks and valleys. One problem with this form of media is that the peaks on an inlet side of the filter may be directly exposed to impingement of impurities as well as another action that can cause cracking or damage to the filter media at the peaks.

Embodiments of the present invention are aimed at rectifying one or more of these problems or otherwise providing improvements over the art.

BRIEF SUMMARY OF THE INVENTION

In one embodiment of the invention, a new and improved method of reinforcing a media pack is provided. The method includes forming a media pack to have an inlet face and an outlet face. The method includes applying a reinforcing agent to the media pack. The reinforcing agent is applied in a flowable state. The method also includes hardening the reinforcing agent to form a reinforcing structure to reinforce the media pack.

In some methods, the reinforcing agent is applied proximate at least one of the inlet face and the outlet face.

In one method, applying the reinforcing agent includes immersing at least one of the inlet face and the outlet face in the reinforcing agent. This may be done using a bath housing the reinforcing agent in the flowable state.

In one method, applying the reinforcing agent includes immersing less than the entire media pack in the reinforcing agent.

In more particular embodiments, the reinforcing agent may be, in the flowable state, a liquid or a powder.

In one method, hardening the reinforcing agent includes exposing the reinforcing agent to predetermined wavelength of a light.

In one method, hardening the reinforcing agent includes heating the reinforcing agent.

In one method, hardening the reinforcing agent includes drying the reinforcing agent without heating the reinforcing agent.

In one method, the media pack is z-media having a plurality of adjacent layers of fluted filter media defining the inlet face and the outlet face. Each layer includes a corrugated sheet and a facer sheet attached to the corrugated sheet to form a plurality of inlet and outlet flutes extending between the inlet and outlet faces.

In one method, the inlet flutes have an open end proximate the inlet end and a closed end proximate the outlet end. The outlet flutes have a closed end proximate the inlet end and an open end proximate the outlet end, the reinforcing agent does not close the open ends of the flutes.

In one method, the inlet flutes are open proximate the inlet end and closed proximate the outlet end by outlet end sealant and the outlet flutes are closed proximate the inlet end by inlet end sealant and open proximate the outlet end. The reinforcing agent being different than the inlet end sealant and outlet end sealant.

In one method, the inlet and outlet end sealant has a higher viscosity than the reinforcing agent when in a flowable state.

In one method, the method further includes attaching a seal member to the media pack adjacent the reinforcing agent. The seal member may provide a radially outward directed seal surface. The seal member may provide an axially directed seal surface.

In one method, the seal member is molded directly to an outer periphery of the media pack.

In one method, a portion of the seal member overlaps with a portion of the reinforcing agent.

In one method, the reinforcing agent is applied to only a portion of the cross-section of the media pack. In one method, the reinforcing agent is applied proximate an outer periphery of the corresponding face of the filter media pack.

In one method, applying the reinforcing agent includes absorbing the reinforcing agent into media of the media pack. In one method, applying the reinforcing agent includes coating surfaces of filter media of the media pack with the reinforcing agent.

In one method, the method further includes coupling a plurality of layers of media together to form the media pack.

In one method, applying the reinforcing agent occurs while coupling the adjacent layers of media.

In one method, applying the reinforcing agent occurs after coupling the adjacent layers of media.

In one method, coupling a plurality of layers of media together occurs by winding a single strip of media to form a coiled media pack.

In one method, coupling a plurality of layers of media together occurs by stacking a plurality of strips or segments of media to form a stacked media pack.

In one method, the media is provided by z-media. Each layer includes a corrugated sheet and a facer sheet attached to the corrugated sheet to form a plurality of inlet and outlet flutes extending between the inlet and outlet faces.

In one method, applying the reinforcing agent includes spraying the reinforcing agent onto the filter media pack or the media pack prior to forming the pack. Applying the reinforcing agent may include wiping the reinforcing agent onto the filter media pack or the media prior to forming the pack.

In one method, the reinforcing agent extends at least 0.100 inch, and preferably 0.125 inch into the filter media pack from one of the flow faces.

In one method, hardening the reinforcing agent includes applying a second material to the reinforcing agent to cure the reinforcing agent. In a more particular embodiment, the reinforcing agent and second material are a multipart epoxy.

In one method, the reinforcing agent is impregnated into the media of the filter media pack such that the filter media forms a substrate. The reinforcing agent extends through the media prior to the step of hardening such that the reinforcing structure is comprised of a matrix of the hardened reinforcing agent and the media substrate.

In a further embodiment, a filter media pack is provided having filter media and a reinforcing structure. The filter media has an inlet face and an outlet face. The reinforcing structure is a composite structure comprising a reinforcing agent impregnated into the filter media such that the filter media forms a substrate and the reinforcing agent forms a hardened matrix.

The filter media forms a plurality of pores therethrough and the reinforcing agent extends through at least some of the pores entirely through the filter media.

In one embodiment, the reinforcing structure is formed proximate one of the inlet face and outlet face. In one embodiment, a reinforcement structure is formed proximate both the inlet and outlet faces.

In one embodiment, a seal arrangement is attached to the filter media proximate the reinforcing structure.

The filter media may be fluted media (also referred to as z-media). The filter media may be pleated media.

In one embodiment, the seal arrangement includes a seal member that provides a radially outward directed seal surface. Alternatively, the seal member could provide an axially directed seal surface.

In one embodiment, the filter media is z-media having a plurality of adjacent layers of fluted filter media defining the inlet face and the outlet face. Each layer includes a corrugated sheet and a facer sheet attached to the corrugated sheet. The layers of fluted filter media form a plurality of inlet and outlet flutes extending between the inlet and outlet faces.

In one embodiment, the inlet flutes are open proximate the inlet end and closed proximate the outlet end by outlet end sealant. The outlet flutes are closed proximate the inlet end by inlet end sealant and open proximate the outlet end. The reinforcing agent is different than the inlet end sealant and outlet end sealant in at least one physical characteristic. In one embodiment, the characteristic is viscosity in a flowable state.

In one embodiment, the inlet flutes have an open end proximate the inlet end and a closed end proximate the outlet end. The outlet flutes have a closed end proximate the inlet end and an open end proximate the outlet end. The reinforcing agent does not close the open ends of the flutes. In a more particular embodiment, the reinforcing agent takes up less than 20% the cross-sectional area of the open ends of the flutes. In a more particular embodiment, the reinforcing agent takes up less than 10% the cross sectional area of the open ends of the flutes.

In one embodiment, a filter media pack is provided. The filter media pack is formed by the process comprising the steps of: providing a filter media pack having an inlet face and an outlet face; absorbing a reinforcing agent in a liquid state into media pack; and hardening the reinforcing agent to a solid to provide structural rigidity to the filter media pack. The reinforcing agent may be, in a more particular embodiment, located proximate one of the inlet or outlet faces.

In one embodiment, a filter media pack is provided including a plurality of layers of fluted filter media and a reinforcing component. The plurality of adjacent layers of fluted filter media defines an inlet face and an outlet face. Each layer including a corrugated sheet and a facer sheet attached to the corrugated sheet to form a plurality of inlet and outlet flutes extending between the inlet and outlet faces. The reinforcing component is applied to the filter media in a flowable state and then hardened to a solid state to reinforce the filter media. In one more particular embodiment reinforcing component is located adjacent the inlet and/or outlet face.

In one embodiment, a filter media pack is provided. The filter media pack includes a plurality of layers of fluted filter media. Each layer of fluted filter media includes a fluted sheet forming a plurality of peaks and valleys attached to a first face of a facer sheet forming a plurality of flutes between the facer sheet and the fluted sheet. The flutes extending between a first edge and a second edge. The facer sheet forming a second face opposite the first face. At least one first stitch bead secures adjacent layers together. The first stitch bead is formed between the fluted sheet of a first layer of filter media and the second face of the facer sheet of an adjacent second layer of filter media. The first stitch bead does not close the flutes formed between the first and second layer of filter media.

In a particular embodiment, the first stitch bead extends less than an entire distance between adjacent peaks of the fluted sheet.

In a particular embodiment, each layer of fluted filter media includes a first seal bead between the fluted sheet and the facer sheet closing off flutes formed between the facer sheet and the fluted sheet. A second seal bead is formed between the fluted sheet of the first layer of filter media and the second face of the facer sheet of the adjacent second layer of filter media closing off flutes formed between the adjacent first and second layers of fluted filter media. The first and second seal beads are axially spaced apart from one another along the flutes.

In a particular embodiment, each layer of fluted filter media includes a second stitch bead formed between the fluted sheet and the first face of the facer sheet. The second stitch bead does not close the flutes formed between the fluted sheet and the first face of the facer sheet.

In an embodiment, the first stitch bead is a continuous bead of adhesive extending entirely between adjacent peaks of the fluted sheet.

In an embodiment, the plurality of layers of fluted filter media are formed by winding a continuous piece of fluted filter media to form adjacent layers of fluted filter media.

In an embodiment, the plurality of layers of fluted filter media are formed from a plurality of strips of fluted filter media stacked on top of one another.

In one embodiment, a method of forming a filter media pack is provided. The method includes: securing adjacent layers of fluted filter media, each layer of fluted filter media including a fluted sheet forming a plurality of peaks and valleys attached to a first face of a facer sheet forming a plurality of flutes between the facer sheet and the fluted sheet extending between a first edge and a second edge, the facer sheet forming a second face opposite the first face; and wherein attaching adjacent layers includes providing at least one first stitch bead securing adjacent layers together, the first stitch bead being formed between the fluted sheet of a first layer of filter media and the second face of the facer sheet of an adjacent second layer of filter media, the first stitch bead not closing the flutes formed between the first and second layer of filter media.

In an embodiment, the step of securing adjacent layers includes winding a continuous piece of fluted filter media to form adjacent layers.

In an embodiment, the step of providing the at least one first stitch bead occurs while winding the fluted filter media.

In an embodiment, the step of securing adjacent layers includes forming individual strips of fluted filter media and stacking them to form adjacent layers.

In an embodiment, the method includes forming the fluted filter media which includes securing the fluted sheet to the facer sheet with a second stitch bead. The second stitch bead does not close off the flutes formed between the first face and the fluted sheet.

In an embodiment, forming the fluted filter media includes forming a first seal bead while forming the fluted filter media. The first seal bead is formed between the fluted sheet and the facer sheet and closing off the flutes formed therebetween. The method further includes forming a second seal bead between the adjacent layers. The second seal bead closes off flutes between the fluted sheet of the first layer and the second face of the facer sheet of an adjacent second layer of filter media.

In an embodiment, the first and second seal beads each have an average thickness that are thicker than an average thickness of the first stitch bead.

In an embodiment, the step of providing at least one stitch bead includes applying the stitch bead directly to the peaks of the fluted sheet of the first layer and then pressing the second face of the facer sheet of the adjacent second layer against the adhesive and peaks of the first layer.

In an embodiment, the step of providing at least one stitch bead includes applying the stitch bead directly to the second face of the facer sheet of the adjacent layer of fluted filter media and then pressing the peaks of the fluted sheet of the first layer of fluted filter media against the adhesive and second face of the facer sheet of adjacent layer of fluted filter media.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a perspective illustration of a filter element according to an embodiment of the invention;

FIG. 2 is a partial cross-sectional illustration of the filter element of FIG. 1;

FIG. 4 is an enlarged illustration of the seal arrangement of the filter element of FIG. 2;

FIG. 10 is a simplified perspective illustration of a method of applying the reinforcing agent while winding the filter media;

FIG. 11 is a further simplified embodiment of a filter element wherein the reinforcing agent does not cover an entire cross-section of the filter media and includes multiple reinforcing structures;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 3:
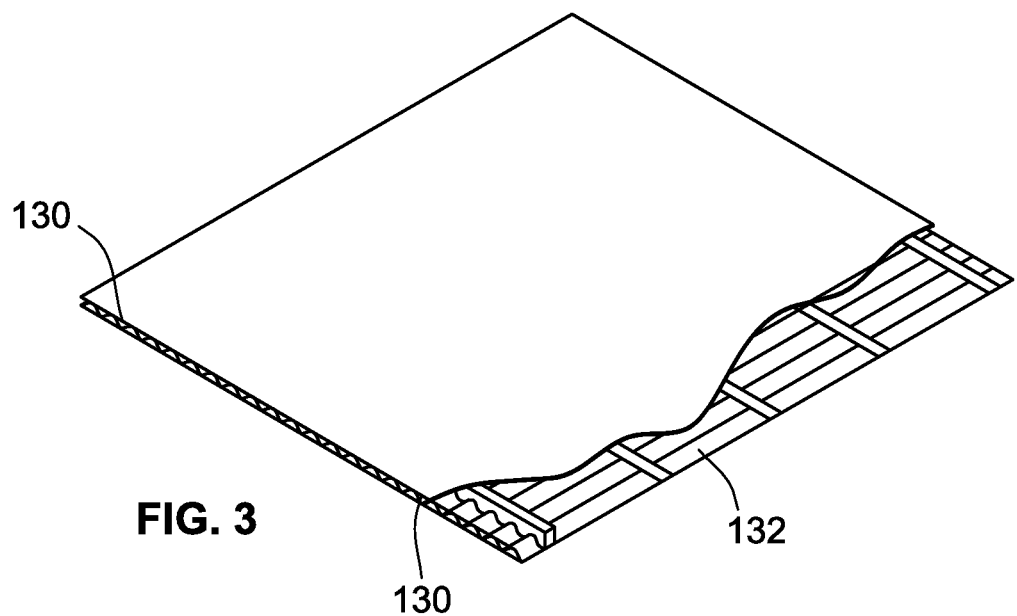
FIG. 3 is a perspective illustration of a layer of filter media formed from a corrugated sheet attached to a facer sheet.
Figure 5:
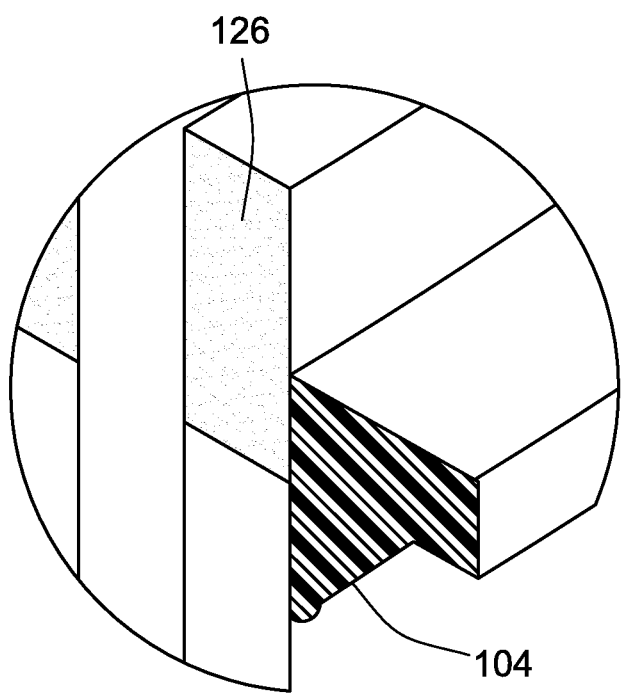
FIG. 5 is a further embodiment of a seal arrangement.

FIGS. 1-3 show a first embodiment of the present invention in the form of a filter element 100 adapted for insertion into a filter housing for removing particulate matter from a flow of fluid passing through the filter housing. The term fluid as used herein is intended to include fluids in either liquid or gaseous forms; however, the embodiments shown herein illustrate an air filter of the type used for filtering intake air for engines and air compressors. It is understood that inventive features may also be applicable to liquid applications.

The filter element 100 of the first embodiment is generally shown in FIGS. 1-2 as an annular shape with a race-track-like cross section. The term "annular" is used herein in accordance with the common dictionary definition to describe a variety of ring-like shapes disposed about an axis or centerline. Annular shapes, as contemplated by the inventors, may include, but are not limited to, shapes that are round, rectangular, oval, or race-track-like with two generally straight and parallel sides joined by rounded ends.

To generally introduce different components, the filter element 100, as shown in FIGS. 1-2, includes a filter media pack 102 and a seal arrangement 104 for sealing with a housing in which the filter element 100 is to be mounted.

The filter media pack 102 of the illustrated embodiment has opposed flow faces in the form of an inlet face 110 and an outlet face 112.

In the illustrated embodiment, with additional reference to FIG. 3, the filter media pack 102 is a fluted media pack formed from a plurality of adjacent layers of filter media, which may include a flat sheet layer and a fluted or corrugated layer. The fluted filter media forms a plurality of inlet flutes 114 that have an open inlet end 116 adjacent the inlet face 110 and a closed outlet end 118 adjacent the outlet face 112. The closed outlet end 118 is closed by a sealing bead 120. The fluted filter media also forms a plurality of outlet flutes 122 that have a closed inlet end 124 that is closed by a sealing bead 126 adjacent the inlet face 110. The outlet flutes 122 have an open outlet end 128 adjacent the outlet face 112. Fluid to be filtered enters the filter media pack 102 through the open inlet ends 116 of the inlet flutes 114 passes through the porous filter media to the outlet flutes 122 and out the open outlet ends 128 of the outlet flutes 122 through the outlet face 112.

With reference to FIG. 3, the fluted filter media includes a facer sheet 130 of porous filter media and a fluted sheet 132 (also referred to as a corrugated sheet) of porous filter media secured together to form a layer of fluted filter media. Typically, the facer sheet 130 is attached to the fluted sheet 132 by a first bead of sealant that also forms one of the inlet or outlet sealing beads 120, 126 that closes one of the ends of either the inlet or outlet flutes 114, 122.

The fluted sheet 132 may be formed by any appropriate process, such as corrugating or pleating, but preferably by gathering as described in U.S. Patent Publication No. 2006/0091066, entitled "Gathered Filter Media for an Air Filter and Method of Making Same," assigned to the Assignee of the present invention, and incorporated herein by reference. The term "facer sheet", as used herein, is intended to encompass any form of sheet or strip of generally flat, porous or non-porous, material attached to the fluted sheet of porous filter material. In most embodiments of the invention, the facer sheet would preferably be formed of a porous filter material. Further, the facer sheet would typically be flat, but could be corrugated or otherwise shaped as well.

The fluted filter media for the filter element 100 of FIGS. 1-2 is wound around a winding core 134 to provide the plurality of adjacent layers. As the fluted filter media is wound, a second bead of sealant is applied between the facer sheet of one layer and the fluted sheet of the adjacent layer. This second bead of sealant is axially offset from the first bead of sealant along the flutes and is typically located proximate the opposite end of the flutes. This second bead of sealant will form the other one of the outlet or inlet sealing beads 126, 120 that closes the other end of the outlet or inlet flutes 122, 114.

The winding core 118 can take various shapes and dimensions. One example of the winding core 118 is disclosed in U.S. patent application Ser. No. 11/634,647, entitled "Fluid Filter Apparatus Having Filter Media Wound About a Winding Frame," assigned to the Assignee of the present invention, and incorporated herein by reference. In alternative embodiments, the fluted filter media pack 102 may be formed without using a winding core.

In the illustrated embodiment, the seal arrangement 104 is provided proximate the inlet face 110 of the filter media pack 102. The seal arrangement 104 includes a seal member 140 for engaging a housing having a sealing surface (not shown). In the illustrated embodiment, the seal member 140 provides an axial seal. However, in other embodiments, the seal member 140 could be configured to provide a radial seal.

The seal member 140 has a sealing surface 142 configured to seal against the sealing surface of the filter housing to form an axial seal between the filter housing and the filter element 100. When the filter element 100 is placed in the filter housing, the seal member 140 is compressed against the sealing surface of the filter housing such that the sealing surface 142 of the seal member 140 and the sealing surface of the filter housing provide a seal between the filter element 100 and the housing to prevent any unfiltered air from bypassing the filter media pack 102 while flowing through the filter housing. The seal member 140 may be formed of any suitable sealing materials including but not limited to polymeric materials and polymer foams, preferably, urethane foam. Expandable materials such as urethane are particularly advantageous because they are resilient to provide a sealing function and can be molded directly to the filter media pack 102 or onto a seal support member 144, such as illustrated in FIGS. 1-2. Further yet, the seal member 140 could be separately formed and then adhesively or otherwise secured to the filter media pack 102 or the seal support member 144.

When mounted in an air supply system, such as an air intake system for an engine, these filters are typically exposed to a suction applied at the outlet face 112 as illustrated by suction force S in FIG. 1. This suction force S tends to cause the filter media and layers of filter media to compress radially inwardly as illustrated by arrows 146.

This inward compression can pose several problems. First, this can cause the layers of filter media to separate and create possible leak paths. Further, this can cause the filter media to separate from the seal arrangement 104 depending on the rigidity of the seal arrangement 104 or how tightly the seal arrangement 104 is axially engaged with the housing in an axial sealing configuration. Further, if the seal arrangement 104 provides a radial seal with the housing, the inward compression of the filter media pack 102 can likewise draw the seal arrangement radially inward reducing the seal engagement between the seal arrangement 104 and the sealing surfaces of the filter housing. This is particularly true if the seal arrangement 104 is merely the seal member 140 secured to the filter media pack 102 without any more rigid support member.

A further problem associated with the pressure differential across the filter element 100 and flow of air through the filter element 100 is that the layers of filter media can telescope axially. More particularly, adjacent layers of the filter media will slip axially relative to one another which can create leak paths as well as exacerbate the issues relating to radial compression discussed previously.

Figure 6:
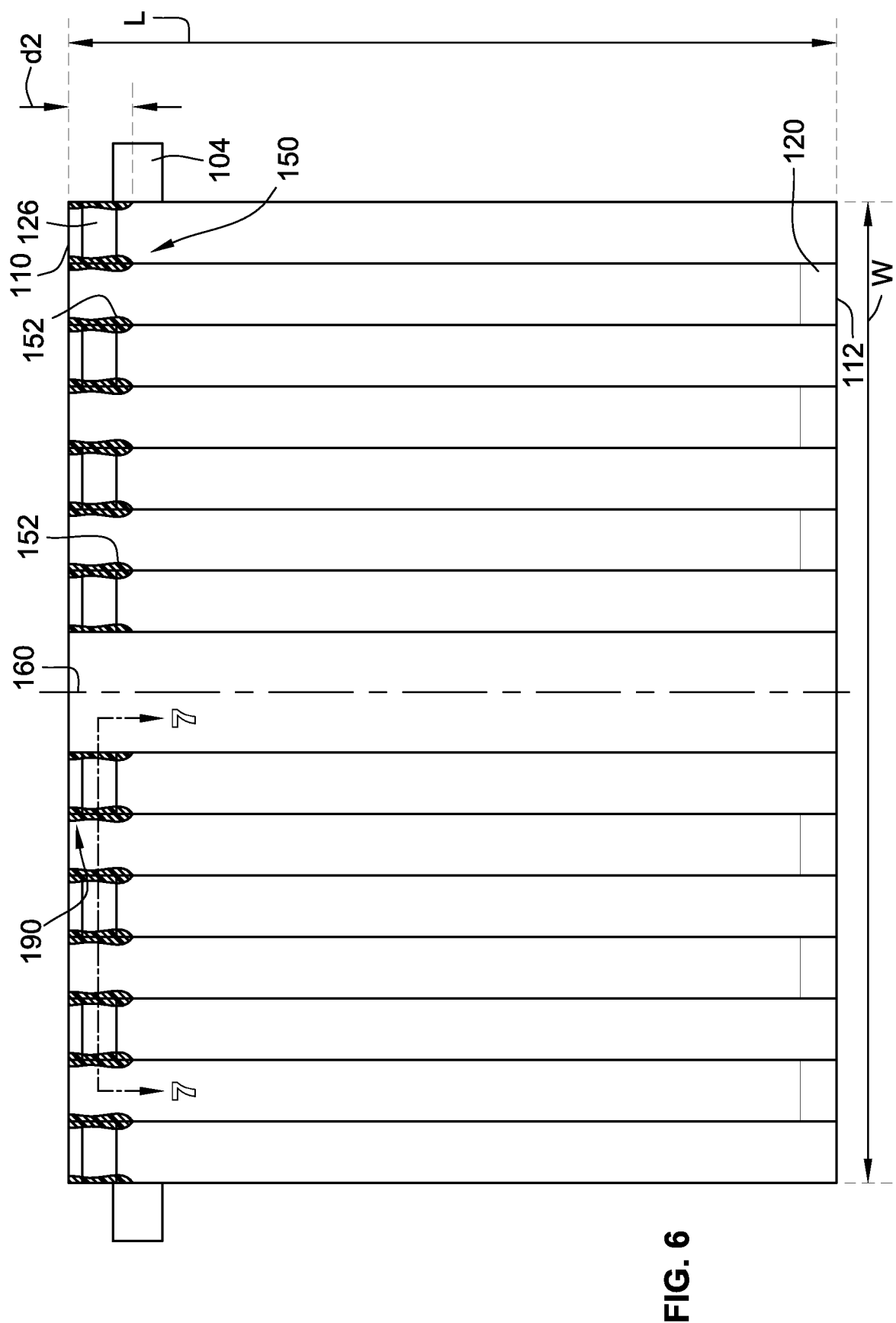
FIG. 6 is a simplified cross-sectional illustration of a filter element having a reinforcing structure according to an embodiment of the invention taken about line 6-6 of FIG. 1.
Figure 7:
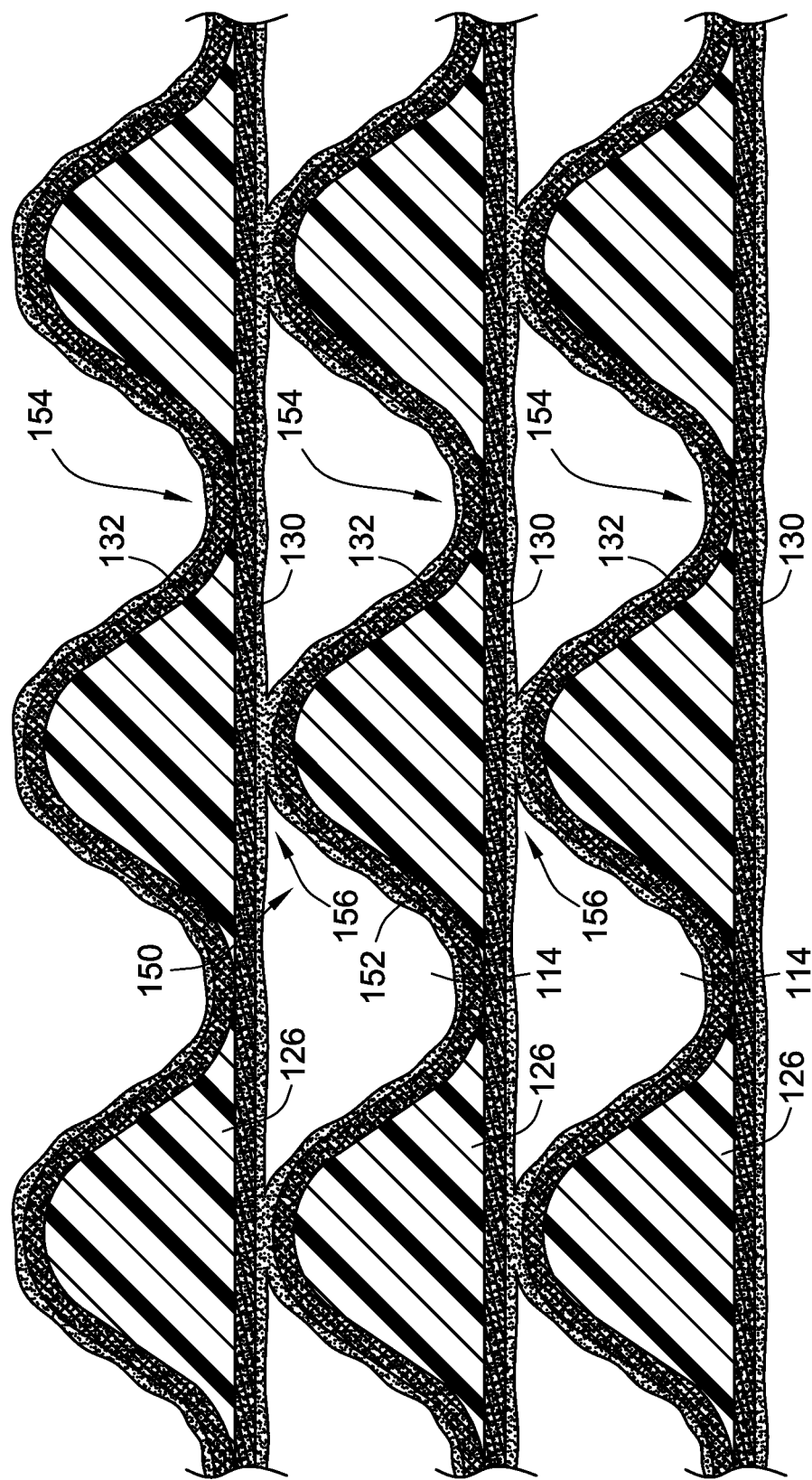
FIG. 7 is a partial cross-sectional illustration of the filter media of FIG. 6 taken about line 7-7.

With reference to schematic illustrations of FIGS. 6 and 7, embodiments of the invention incorporate a reinforcing structure 150 to reinforce the layers of fluted media to prevent one or more of the problems identified above.

The reinforcing structure 150 in FIG. 6 is located adjacent the inlet face 110. However, it could be located adjacent the outlet face 112 or multiple structures could be provided, such as one adjacent the inlet face 110 and one adjacent the outlet face 112. Further, a reinforcing structure could be axially offset from the inlet and outlet faces 110, 112 and be positioned axially inward therefrom.

The reinforcing structure is a composite structure formed from a reinforcing component formed from a reinforcing agent 152 and the sheets of filter media including the face and fluted sheets 130, 132. Preferably, the reinforcing agent is impregnated into the face and fluted sheets 130, 132. In FIGS. 6 and 7, the reinforcing agent 152 is shown as an outer layer of material around the filter media of sheets 130, 132 with an exaggerated thickness for ease of illustration.

Typically, the reinforcing agent 152 will be applied as a liquid and then operably hardened, and more preferably hardened to a solid to provide reinforcement of the media pack 102. In the liquid form, the reinforcing agent 152 will be absorbed into and preferably entirely through the pores of portions of the various sheets of media 130, 132 to further reinforce the media pack 102. This is illustrated by the cross-hatching of the reinforcing agent 152 extending into the cross hatching of the sheets 130, 132 and entirely therethrough such as at regions 154 and 156 in FIG. 7. Typically, at regions 156 there is no adhesive between the facer sheet 130 and the fluted sheet 132 proximate this end of the media pack 102. As such, by using the reinforcing agent 152 an adhesive bond between these two sheets 130, 132 is now provided to further support and strengthen the media pack 102.

After application, the reinforcing agent 152 will harden to form a matrix that penetrates the pores of the media and encapsulates the material of the media, such as fibers thereof. The media thus provides a substrate of the composite structure. This hardened reinforcing structure 150 provides additional bonding between the various sheets to increase the rigidity of the media pack 102. The reinforcing structure 150 will provide additional axial reinforcement to prevent telescoping or slipping of adjacent layers, such as along axis 160 that is typically not present in fluted media, i.e. such as at location 156. The reinforcing structure 150 will also provide further rigidity to provide radial support and strength to prevent or inhibit radial compression or expansion of the media pack 102 toward or away from axis 160 depending on whether the media pack 102 is exposed to a positive or negative differential pressure.

The reinforcing agent 152 will typically be applied to the filter media pack in a flowable state. Typically, the reinforcing agent 152 will be a liquid having a low viscosity. Preferably, the viscosity will be below 1000 centipoise. More preferably, the viscosity is less than 800 centipoise. Even more preferably, the viscosity is between 350 and 650 centipoise and even more preferably between 400 and 600 centipoise. However, it is contemplated that viscosities less than 350 centipoise would provide very positive wicking characteristics. Other embodiments could use a powder material that is applied to the media pack 102. The powder material could then be converted to a rigid structure by a secondary process such as heating or applying a curing or hardening agent.

Typically, the viscosity of the reinforcing agent 152 will be substantially less than the viscosity of the sealant for the first and second beads 120, 126. This is because it is desired that the reinforcing agent does not plug or restrict flow of fluid through the flutes. The sealant for the first and second beads 120, 126 may be formed from numerous different materials but is often formed from a hot melt. When dispensed, the sealant for the first and second beads 120, 126 will often be above 5,000 centipoise, and in some instances much more viscous such as above 10,000 centipoise. The sealant for beads 120, 126 will become more viscous as the sealant cures and hardens after being applied to the media as the sealant cools, particularly when a hot melt type product is used. The higher viscosity of the sealant beads 120, 126 is used such that the sealant beads 120, 126 are sufficient to seal off and close desired ones of the flutes, as illustrated in FIGS. 2 and 7.

Figure 8:
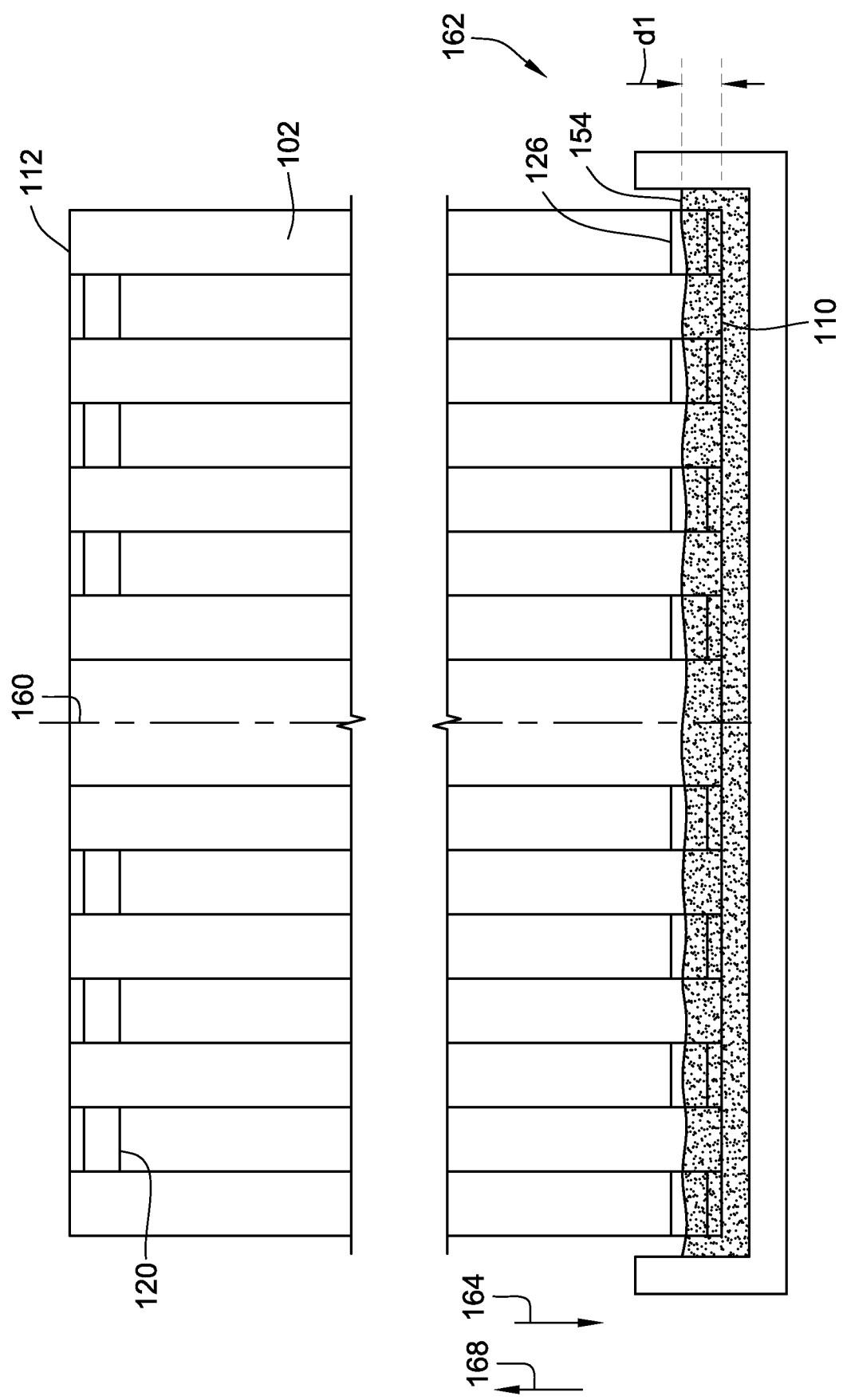
FIG. 8 is a simplified illustration of the step of applying a reinforcing agent using a bath style application.

With reference to FIG. 8, in one embodiment, the media pack 102 is first formed from the filter media. This could be done by winding a continuous layer of media formed from a facer sheet and a fluted sheet to form a plurality of adjacent layers or stacking a plurality of segments of layers to form the media pack 102.

The media pack 102 is then dipped into a bath 162 of liquid or otherwise flowable reinforcing agent 152, such as illustrated by arrow 164 along axis 160 and perpendicular to the inlet and outlet faces 110, 112. The dipping may be to a dipping depth d1 (also referred to as an emersion depth) that is equal to or less than the ultimate depth d2 (see FIG. 6) of the reinforcing agent 152 from the corresponding flow face 110, 112 of the media pack 102. The ultimate depth d2 may also be referred to as the reinforced distance. Typically, the dipping depth d1 will be less than the ultimate depth d2 as the reinforcing agent 152 will wick axially into the media pack 102 further than the dipping depth d1. For instance, with some products that have been tested, the dipping depth d1 was approximately ⅓ the of the ultimate depth d2 of the reinforcing agent 152.

During this dipping process, the flowable reinforcing agent 152 will preferably penetrate into and through the pores within the media to increase the strength of the ultimate reinforcing structure 150 when completed. However, in other embodiments, the reinforcing agent 152 could merely coat the outer surfaces of the media.

The media pack 102 will then be axially lifted out of the bath 160, illustrated by arrow 168.

After the media pack 102 is removed from the bath 162, the liquid reinforcing agent 152 applied to the filter media will be hardened. Prior to hardening, in some embodiments, forced air is blown through the filter element to help clear excess reinforcing agent 152 from the open ended flutes.

Figure 9:
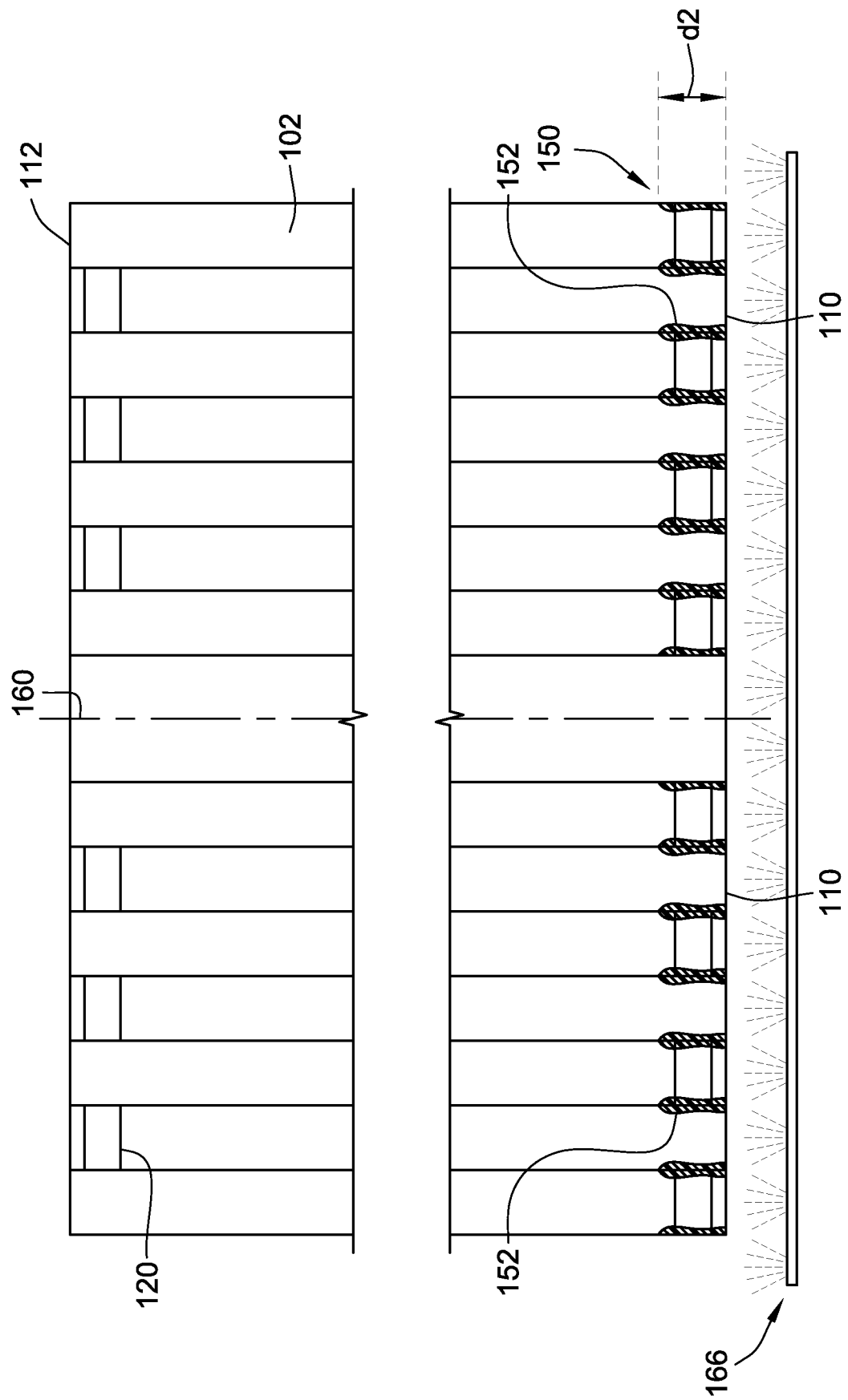
FIG. 9 is a simplified illustration of the step of hardening the reinforcing agent after it has been applied to a filter element.

FIG. 9 illustrates the reinforcing agent 152 being hardened by a hardening mechanism 166.

Depending on the type of reinforcing agent 152, the hardening mechanism 166 may vary. For instance, in some embodiments, the reinforcing agent 152 may be ultraviolet curable. As such, the hardening mechanism 166 could be an ultraviolet light. The reinforcing agent 152 could also be configured to cure based on a different wavelength of light as well, such as a wavelength within the visible light spectrum. Alternatively, the hardening device 166 could be a fan for blowing air against the liquid reinforcing agent. Further, the hardening device could be a heater or even an oven for heat hardening the reinforcing agent. Further yet, in other embodiments, the reinforcing agent 152 could be in the form of a multi-part material such as a multi-part epoxy where the hardening device 166 applies a second component to cause a first component, i.e. the component that would be in bath 162, to cure and harden.

The seal arrangement 104 can then be attached to the media pack 102. Preferably, the seal member 104 is mounted to the media pack 102 proximate the axial location along axis 160 of the reinforcing structure 150. In at least some embodiments, such as illustrated in FIG. 6, the seal arrangement 104 will at least partially axially overlap with the reinforcing structure 150.

The ultimate depth d2 of the reinforcing structure 150 is preferably between ¼ and ½ inch. However, other depths d2 are permissible depending on the overall length L of the media pack 102, the width W of the media pack 102 and the ultimate pressure drop across the media pack 102 (see e.g. FIG. 6). For instance, in some embodiments, ultimate depth d2 may be as low as 0.100 inch.

With reference to FIG. 10, in another embodiment, a method of forming the reinforcing structure 150 applies the reinforcing agent 152 while forming the media pack 102. More particularly, the reinforcing structure 150 is applied either during winding or stacking of the layers of media to form the plurality of layers.

In this embodiment, one of the sealant beads, e.g. sealant bead 126 (not shown in FIG. 10), is already applied between a facer sheet 130 and a fluted sheet 132 to form a layer of fluted filter media proximate inlet end 110. The layer of fluted filter media is being wound around winding core 134.

During the winding process, the second sealant bead 120 is being applied to secure adjacent layers of filter media together. Simultaneously, the reinforcing agent 152 is being applied to the filter media in a flowable state. In this embodiment, a first reinforcing agent applicator 170 applies reinforcing agent 152 to the exposed surface of the fluted sheet 132. A second reinforcing agent applicator 172 applies the reinforcing agent 152 to the exposed surface of the facer sheet 130 in line with the first reinforcing agent applicator 170. As the filter media is wound, the two separately deposited portions of reinforcing agent 152 will align. By applying the reinforcing agent 152 to both sheets 130, 132, it is contemplated that better penetration into both sheets 130, 132 of media may be achieved rather than relying on transfer from one sheet to the other if only a single applicator was provided. However, the use of a single applicator is not excluded from embodiments.

In this embodiment, the reinforcing agent 152 is applied proximate inlet face 110. However, the reinforcing agent 152 could be applied proximate the outlet face 112. Additionally, multiple reinforcing structures could be provided such that the reinforcing agent 152 could be applied at multiple separate locations, such as proximate both the inlet and outlet faces 110, 112. Even further, a reinforcing structure could be located at an axial location between the inlet and outlet faces 110, 112, for example, proximate a midpoint between the inlet and outlet faces 110, 112.

In FIG. 10, a sealant applicator 178 applies sealant bead 120 proximate outlet end 112 simultaneously as the reinforcing agent applicators 170, 172 apply reinforcing agent 152 to the media. Sealant applicator 178 may also apply an initial sealant bead that seals the media to the winding core 134. This initial sealant bead may include a portion that runs longitudinally parallel to the flutes and winding core 134, i.e. in a direction extending between the inlet and outlet faces 110, 112.

In some embodiments, the sealant beads 120, 126 (see also FIGS. 2 and 6) are formed from a material having different physical properties than the reinforcing agent 152. Typically, the material of the sealant beads 120, 126 has a much higher viscosity value than the reinforcing agent 152, in their respective flowable states. This is because the sealant material for sealant bead 120, 126 is configured to plug the channels formed between the facer sheet 130 and fluted sheet 132 to force the air to pass through the porous filter media.

However, the reinforcing agent 152 is selected to specifically prevent or inhibit plugging the open channels formed between the facer sheet 130 and fluted sheet 132 and to be substantially completely absorbed into the media or to more closely conform to the shape of the media in a rather uniform thickness. The low viscosity of the reinforcing agent allows it to closely conform to the surfaces of the media. As such, excess reinforcing agent will drip from the filter media when using the bath style application or will closely conform to the shape of the sheets of media (e.g. facer sheet 130 and fluted sheet 132) when using other types of applicators such as a spray application, wiping application, etc. Due to the low viscosity relative to the sealant material, a globule of the reinforcing agent 152 should not remain within one of the grooves of the valleys or grooves of the fluted media such that the flute formed by that groove would be plugged, unlike for sealant beads 120, 126. In some embodiments, where a more viscous material is used, as noted above, air may be blown through the media pack prior to hardening of the reinforcing agent 152 to help blow excess material out of the open ends of the flutes to prevent undesired plugging.

Ideally, only a very small outer layer of the reinforcing agent 152 extends outward from the surfaces of the filter media such that only a minimum amount of the flute openings would be closed or otherwise blocked due to the reinforcing agent 152 when it hardens. In some embodiments, the reinforcing agent 152 blocks less than 20% of the cross-sectional area of an open flute and even more preferably less than 10%. Again, the drawings have the thickness of the reinforcing agent 152 exaggerated for illustrative purposes.

When the reinforcing agent 152 is applied while forming the media pack 102, the seal arrangement 104 will be attached to the media pack after the step of applying the reinforcing agent. Typically, the seal arrangement 104 would be attached after the sealing agent 152 has been, at least partially, hardened. However, this order is not required.

While the prior embodiments disclose a reinforcing structure 150 that would be applied to substantially the entire cross-sectional area (perpendicular to the longitudinal axis 60, e.g. flow axis) of the filter media of the media pack 102, other embodiments could apply the reinforcing agent 152 to only a portion of the media pack. For example, if the media pack is a wound media pack having twenty (20) wound layers, the reinforcing agent 152 may only be applied to the first ten (10) inner layers or the outer ten (10) layers but not to all twenty (20) layers.

If the reinforcing agent 152 is applied as illustrated in FIG. 10 during the winding process, the application of the reinforcing agent 152 could be started or stopped to apply the reinforcing agent 152 at the desired location of the cross-section. Further, multiple locations of the cross-section could have reinforcing agent 152. This is illustrated in FIG. 11 by regions 180, 182. In this embodiment, only the portion of the inlet end face 110 in regions 180, 182 has a reinforcing structure present. While this embodiment shows an inner reinforcing structure (region 180) and an outer reinforcing structure (region 182), other embodiments could have more or less regions than that are illustrated. Further, while the regions are illustrated at the inlet face 110, the different regions could be at the outlet face 112 or at an axial location between the inlet and outlet faces 110, 112.

Individual regions would typically apply the reinforcing agent to multiple adjacent layers of media. The reinforcing agent could be applied to as little as one specific layer; however, it would typically be applied to at least two adjacent layers of the media.

If the reinforcing agent 152 is applied after the media pack 102 is formed, the applicator for applying the reinforcing agent 152 could be a sprayer or brush or a sponge like applicator that applies the reinforcing agent 152 to the desired regions of the cross-section of the media pack 102. The brush or sponge could perform a wiping type application. Such a wiping type application could also be used during the application such as in FIG. 10, rather than spraying.

With reference to FIG. 6, it is contemplated to be beneficial to offset the sealant bead, e.g. sealant bead 126, from the inlet face 110 or outlet face 112 if the reinforcing structure 150 is going to be adjacent thereto. With reference to the inlet face 110, but with equal applicability to the outlet face 112, this allows the portion of the filter media 190 between the inlet face 110 and the sealant bead 126 to absorb the reinforcing agent 152 and form a strong adhesion between the plurality of layers of filter media without interference from the sealant bead 126. However, this is not necessary.

The Applicants have tested the concept of including such a reinforcing structure and have had very successful results relating to structural integrity (e.g. telescoping or failure).

Additionally, similar media packs were tested to determine the effect on overall pack efficiency and capacity. A standard pack (no reinforcement structure) and two media packs including the reinforcement structure 150 at the outlet face were tested using an ISO 5011 test where at a flow rate of 565 SCFM using an airborne contaminant of PTI Fine 11968F, was used until a differential pressure of 30 inch $H_2O$ was reached. One of the media packs (referred to herein as Test Element A) including the reinforcement structure had a minimum amount of reinforcing agent such that it had an ultimate depth of less than ⅛ inch from the outlet face. Another one of the media packs (referred to herein as Test Element B) including the reinforcement structure had a larger amount of reinforcing agent such that it had an ultimate depth of on average between ⅛ inch and ¼ inch of reinforcing agent extending towards the inlet face.

From this test, the pack with the larger amount of reinforcing agent actually had better accumulated efficiency, larger capacity and a lower amount by weight of bypassed particulate. These results were generally expected as the reinforcing structure was positioned proximate the downstream outlet face adjacent the corresponding sealant bead where little to no fluid filtration occurs due to the sealant beads inhibiting fluid flow through that portion of the filter media.

The following specific test results were captured:

|  | Standard Pack | Test Element A | Test Element B |
|---|---|---|---|
| Test Time (min) | 23.9 | 23.3 | 24.0 |
| Initial Restriction (inches of $H_2O$) | 3.6 | 3.6 | 3.6 |
| Acc. Efficiency | 99.97 | 99.98 | 99.99 |
| Capacity (Grams) | 756.69 | 737.15 | 758.50 |
| Grams Bypassed | 0.21 | 0.15 | 0.10 |

Figure 12:
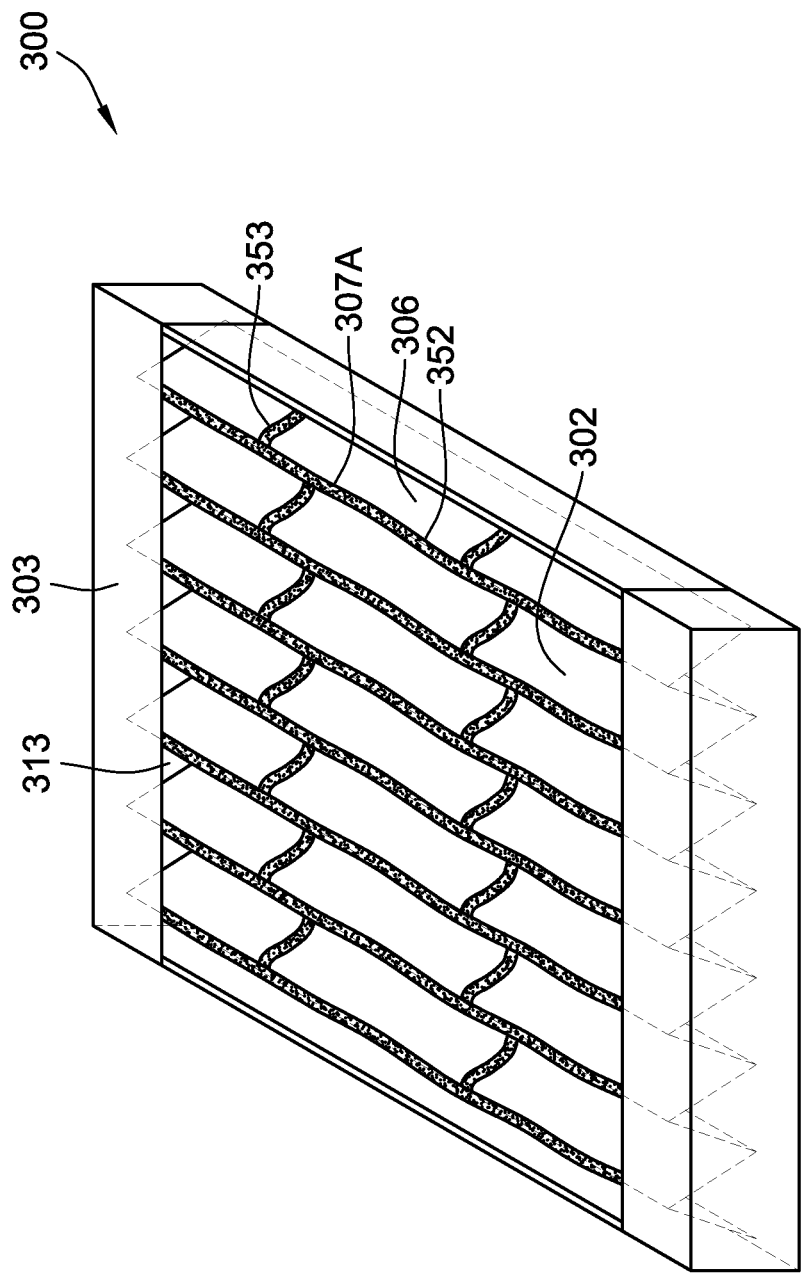
FIG. 12 is a simplified illustration of a further filter element having pleated media utilizing features of the present invention.

FIG. 12 is further embodiment of a filter element 300 according to the present invention. This filter element 300 included a pleated media pack 302 mounted within a frame structure 303. The frame structure may include a seal arrangement for sealing the media pack within filter housing to prevent fluid bypass. The filter media pack 302 will be sealed within the frame structure 303 with a sealant 313 to prevent fluid bypass between the media pack 302 and the frame structure 303. The frame structure can take many forms and could be provided by urethane (particularly foamed urethane), plastic frame materials, a combination of the urethane and plastic materials. When a urethane is used, it may take the form of both the frame structure 303 and the sealant 313. The sealant 313 also seals the open ends of the pleats.

Figure 13:
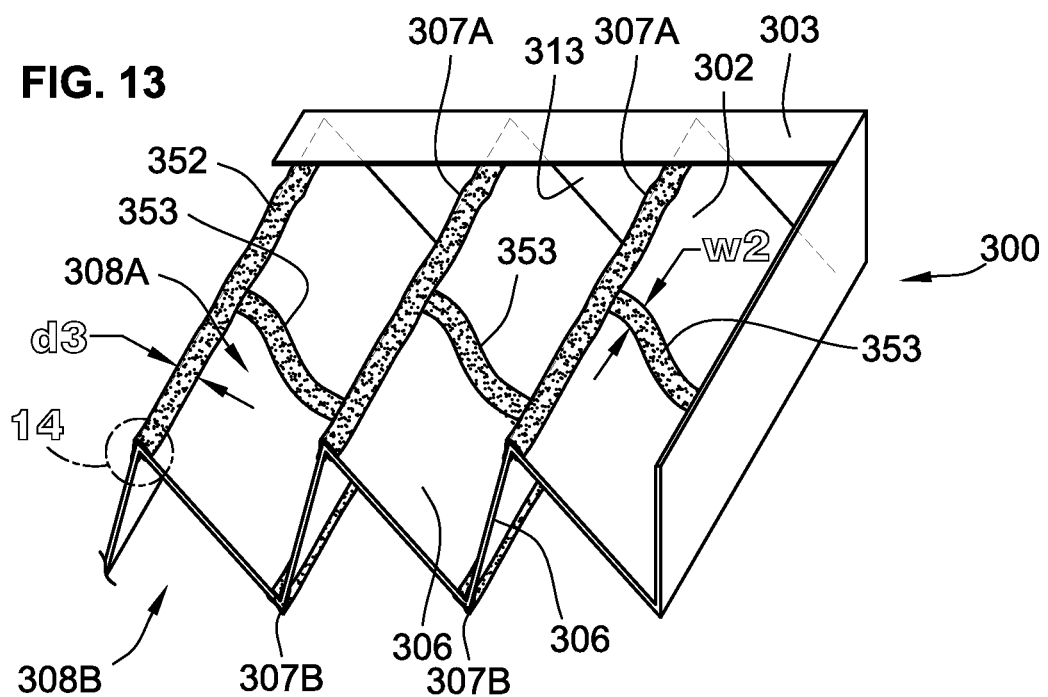
FIG. 13 is a partial cross-sectional illustration of the embodiment of FIG. 12.

With additional reference to FIG. 13, the filter element 300 is shown in partial cross-section. As can be seen in FIG. 13, the pleated media pack 302 is generally a single sheet of media that is folded to form a plurality of adjacent panels 306 that form a plurality of peaks 307 and valleys 308. The peaks 307A form an inlet side or inlet face of the filter element 300 while the peaks 307B form an outlet side or outlet face of the filter element 300. The valleys that open toward the inlet face are referred to as inlet valleys 308A and the valleys that open toward the outlet face are referred to as outlet valleys 308B.

The peaks 307 are generally the folds that connect adjacent panels 306 of the media.

The peaks 307 of the filter element 300 are impregnated with a reinforcing agent 352 to provide strength to the media pack 302. This arrangement may be referred to as a peak reinforcing structure. The reinforcing agent 352 is illustrated as heavy thick lines while filter media without the reinforcing agent 352 is shown schematically as thin lines.

Again, like with previous embodiments using fluted media, it is preferred that the reinforcing agent 352 extends into the pores of the filter media and through the filter media. However, it is possible that it could be provide more as a coating in some embodiments.

In some embodiments, such as illustrated in FIG. 13, the reinforcing agent could extend between peaks 307A and 307B along a face of the panels as illustrated by reinforcing agent 353 to provide additional rigidity and structural support to the pleats. This rigidity can help keep adjacent panels 306 of filter media from collapsing on one another and closing the valleys 308A, 308B such that the filtering capacity of the filter element 300 is diminished. While only a single strip of reinforcing agent 353 is illustrated, multiple strips could be provided between opposed edges of the filter media. Multiple strips are illustrated in FIG. 12. Again, preferably, the reinforcing agent 353 penetrates through the filter media to form a composite reinforcing structure formed from the reinforcing agent 353 and the material of the filter media. It is noted that the portion of reinforcing agent 352 on the peaks 307A, 307B can also provide rigidity and help keep the peaks 307A, 307B separated.

Preferably, the width w2 of the strips of reinforcing agent 353, also referred to as intermediate reinforcing structures, is between about ⅛ inch and ⅜ inch so as to provide sufficient strength or support without unduly limiting the filter capacity of the filter media.

Figure 14:
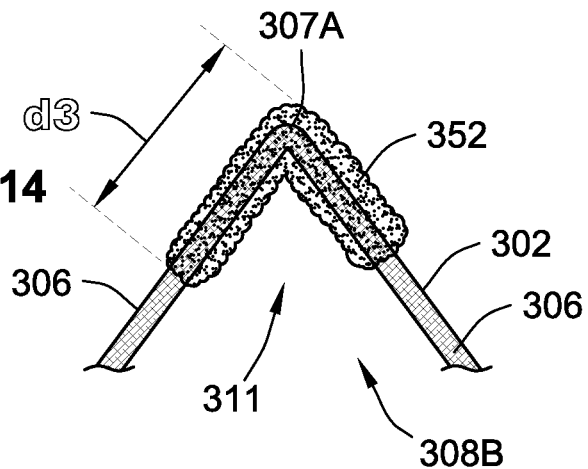
FIGS. 14 and 15 are enlarged illustrations of embodiments of the tip of the pleats of the pleated media of FIG. 13 including reinforcing agent applied thereto.

Similarly, the depth d3 that the reinforcing agent 352 penetrates from a given peak 307A, 307B towards the next peak 307B, 307A (i.e. from the inlet face towards the outlet face or from the outlet face towards the inlet face along a given panel) is preferably between about ⅛ inch and ¼ inch so as to provide protection and strength to the corresponding peaks 307A, 307B. FIG. 14 is an enlarged cross-sectional illustration of one peak 307A illustrating reinforcing agent 352 applied to the peak 307A. Preferably, the reinforcing agent 352 extends entirely through the filter media. It should be noted that, like before, the thickness of the reinforcing agent 352 is exaggerated for illustrative purposes only.

Figure 15:
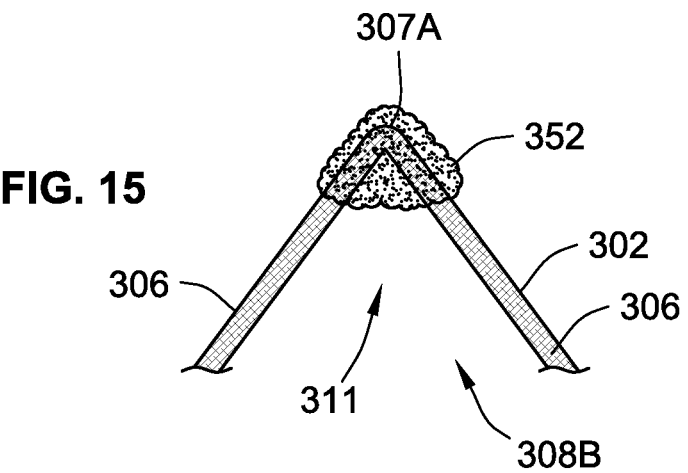

In some embodiments, the reinforcing agent 352 will not fully fill the portion 311 of the corresponding valley 308B proximate the peak 307A and will generally form a V-shape. In alternative embodiments, the reinforcing agent could entirely fill the portion 311 (see e.g. FIG. 15) to be similar to a triangular shape of reinforcing agent 352.

The application of the reinforcing agent 352 to the peaks 307 helps prevent cracking or damage to the peaks 307 due to impingement of fluid flow and impurities as well as the cyclical pressure loading that can be applied to the filter media during a duty cycle of a filter element.

The reinforcing agent 352, 353 could be applied similar to those methods above such as dipping in a bath, spraying, or brushing/wiping.

Typically, the sealant 313 will have a different characteristic than the reinforcing agent 352, 353 but need not be in all embodiments. Typically, the reinforcing agent 352, 353 will have a lower viscosity than the sealant 313.

When pleated filter media is used, it is desired that the reinforcing agent covers less than 20% of the surface are of the filter media, more preferably, less than 10% of the surface area of the filter media and even more preferably less than 5% of the surface area of the filter media.

Figure 16:
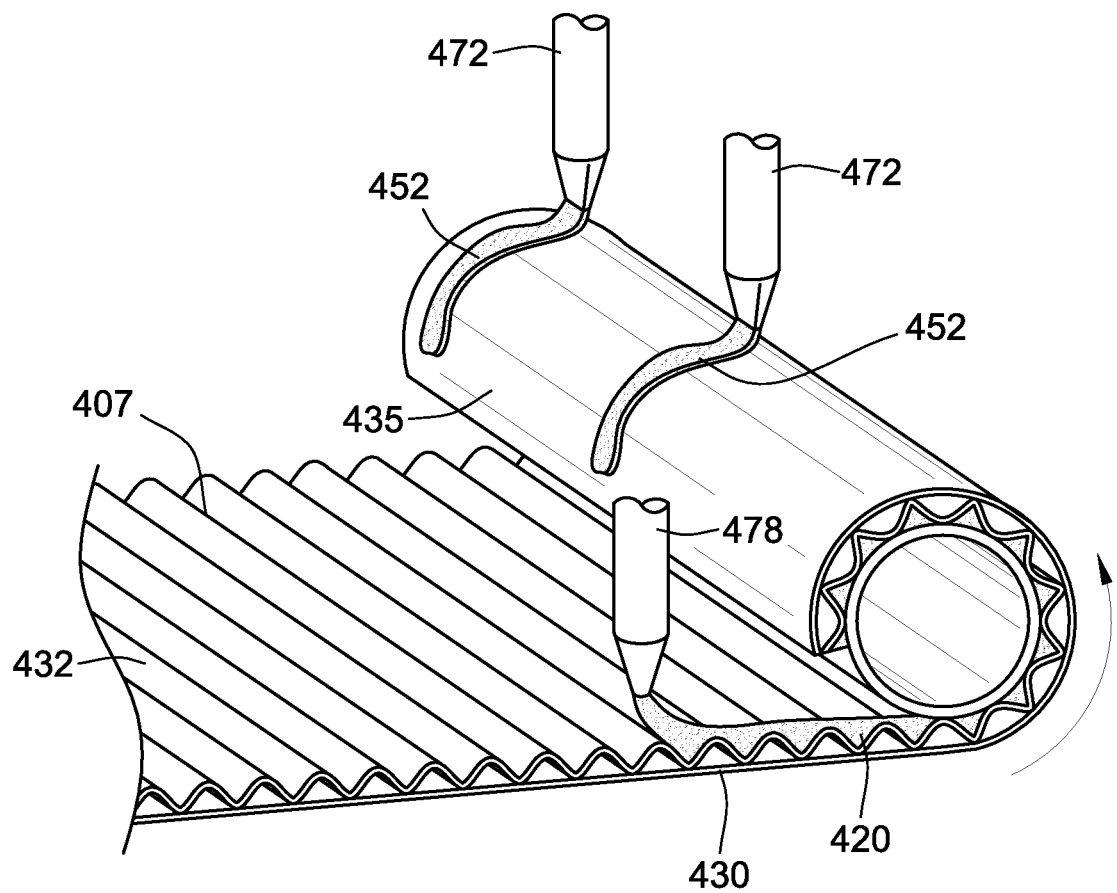
FIG. 16 illustrates a method of applying a stitch bead while winding a fluted filter media pack.

FIG. 16 illustrates a further embodiment of a method of forming a filter media pack. In this embodiment, the resulting filter element is again formed by winding filter media to form a plurality of layers of filter media. In this embodiment, during the winding process as well as application of bead 120, a plurality of reinforcing stitch beads 452 are being applied by applicators 472. The stitch beads help secure the adjacent layers of the filter media together and prevent telescoping as well as improved rigidity for the resulting filter media pack.

The stitch beads 452 are applied between the adjacent layers of media. The stitch beads 452 are thin layers of adhesive used to secure the exposed peaks 407 of the fluted sheet 432 to the exposed surface 435 of the facer sheet 430. While a high penetration adhesive may be used other higher viscous adhesive such as a hot melt may also be used.

The thickness of the stitch beads 452 is such that the open flutes, i.e. regions formed between peaks 407 of the fluted sheet, are not blocked by the adhesive forming the stitch beads 452.

In this embodiment, each of the stitch beads 452 is a continuous strip of adhesive applied to surface 435 during the winding process. In other embodiments, the stitch bead 452 could be intermittently applied.

Figure 17:
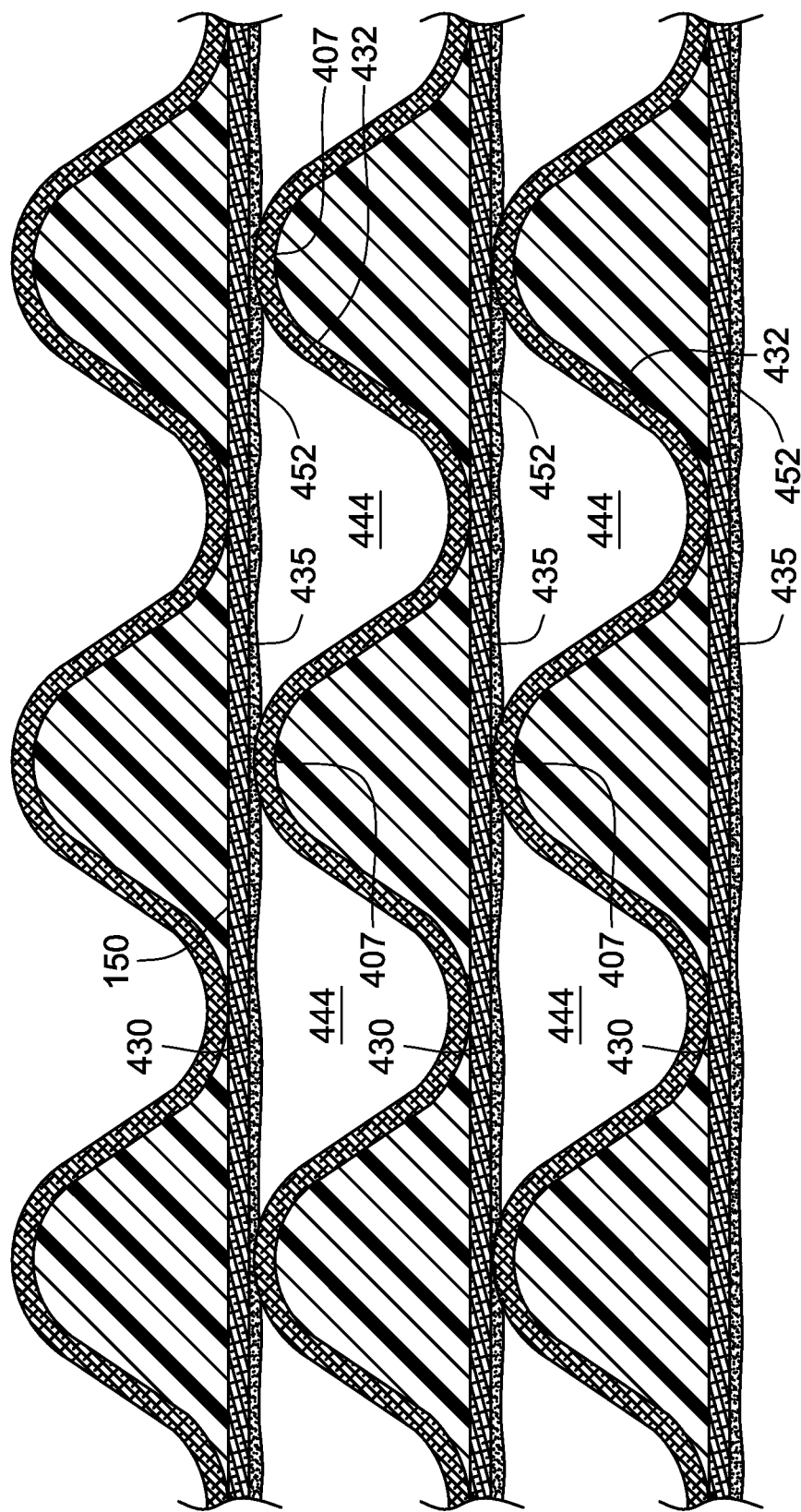
FIG. 17 is a cross-sectional simplified illustration of the stitch bead formed using the process illustrated in FIG. 16.

FIG. 17 is a simplified cross-sectional illustration of adjacent layers of filter media after formation using the process illustrated in FIG. 16. Here, adhesive stitch beads 452 were applied to surface 435 of facer sheet 430. In this illustration, the adhesive forming stitch beads 452 only slightly penetrates into the fluted sheet 432 (e.g. at the peaks 407) and surface 435 of the facer sheet 430. As illustrated, the adhesive only slightly interferes with the open flutes 444 formed between adjacent peaks 407 and surface 435 of the facer sheet 430. Preferably, the stitch beads 452 fill less than 10% of the cross-sectional area of the open flutes 444 and preferably less than 5% of the cross-sectional area of the open flutes 444.

While the embodiment of FIG. 16 illustrates a plurality of stitch beads, some embodiments may have only a single stitch bead while other embodiments may have more than two stitch beads.

While being applied during the winding process, other embodiments could incorporate such a stitch between adjacent stacked layers of filter media. Further, while FIG. 16 only illustrates a stitch bead being formed while winding the layers of fluted filter media, stitch beads could also be formed to hold the fluted sheet 432 to the facer sheet 430 during the initial formation of the layer of filter media.

Preferably, the adhesive used to form the stitch bead has a quick cure rate (also referred to as quick setting). This type of adhesive is often referred to as having an aggressive green-tack. In one embodiment, the stitch bead could be formed by a visible light cure adhesive where the adhesive is cured proximate the time at which the two layers of media are being brought together.

While the stitch beads 452 help the structural integrity of the resulting media pack, the stitch beads 452 also help resist synching of the layers of filter media during the winding process, e.g. to inhibit slipping of adjacent layers during winding in a direction perpendicular to axis around which the layers of filter media are wound.

As illustrated in FIG. 17, because the stitch bead is not a seal bead, the stitch bead 452 will have less adhesive at a given location than the corresponding seal bead. For instance, the thickness of a stitch bead when measured perpendicular to the layer of media will be less than the thickness of a seal bead as it is being applied during manufacture.

In this embodiment, seal bead 420 is being applied during the winding process to close off one end of the flutes that are formed between the adjacent layers of fluted filter media. The other seal bead would be formed during the process of forming the fluted filter media and would be located between the facer sheet 430 and the fluted sheet 432. These two seal beads are axially spaced apart and located proximate opposite edges of the layer of fluted filter media. Further, the stitch beads 452 are illustrated as being axially spaced from seal bead 420 along the axis of the flutes.

Figure 18:
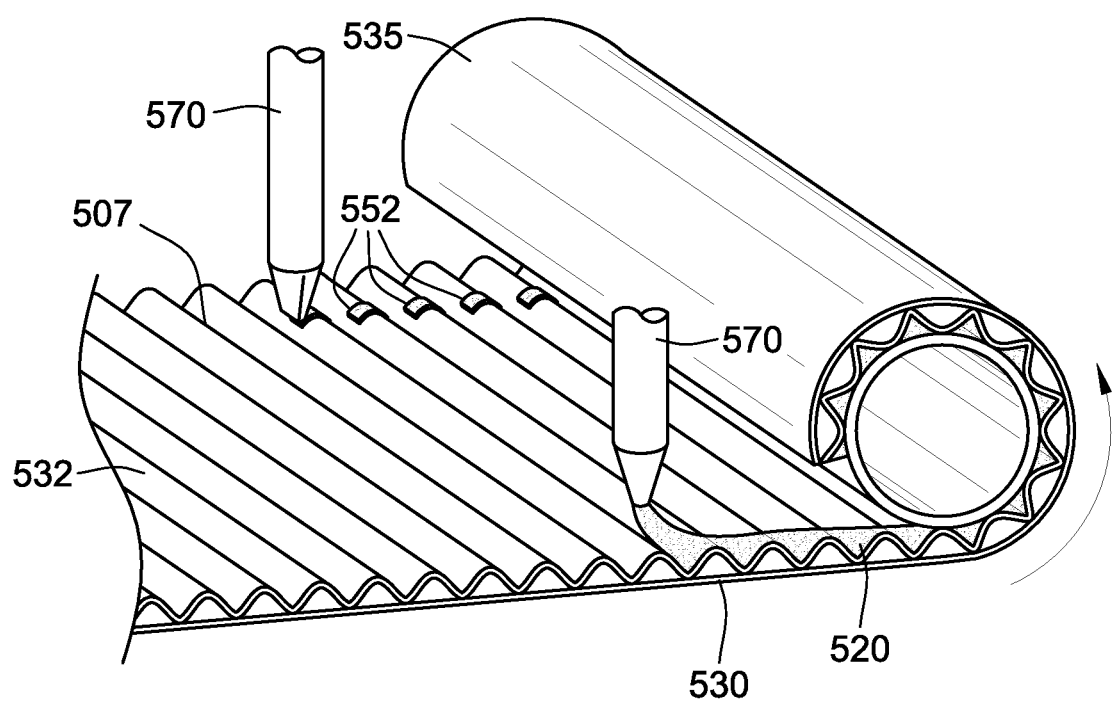
FIG. 18 illustrates a method of applying a stitch bead while winding a fluted filter media pack.
Figure 19:
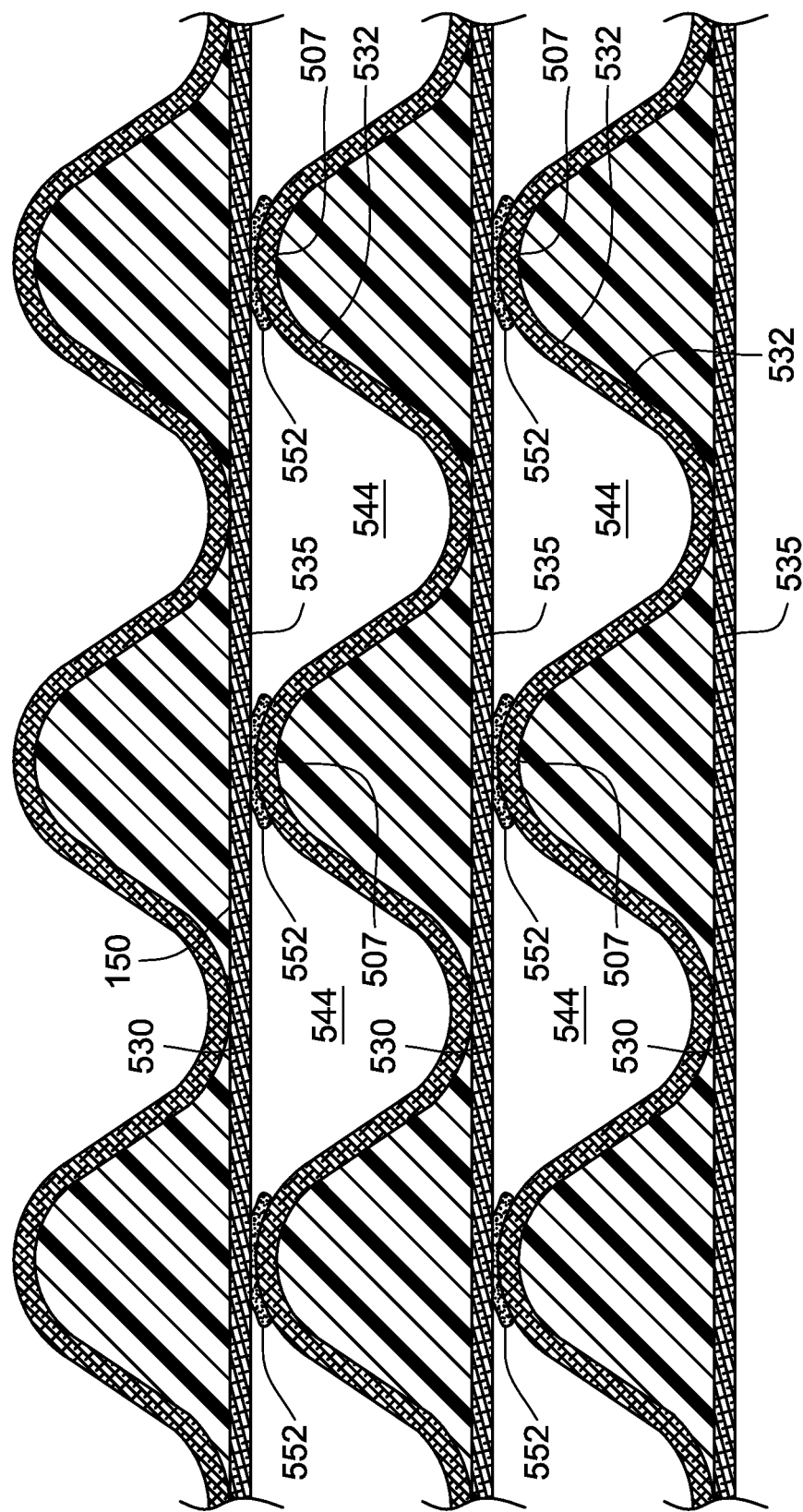
FIG. 19 is a cross-sectional simplified illustration of the stitch bead formed using the process illustrated in FIG. 19.

FIGS. 18 and 19 illustrate a further embodiment that is similar to those described with reference to FIGS. 16 and 17. Here, a stitch bead 552 is again being applied between adjacent layers of wound filter media. Rather than applying a bead of adhesive to surface 535 of the facer sheet 530, the adhesive for the stitch bead 552 is applied directly to the peaks 507 with applicator 570. The applicator 570 may be a pressurized ejector or could operate in other manners such as by a rolling action or a wiping action to apply the adhesive to peaks 507.

As the filter media is being wound, the adhesive forming stitch bead 552 is sandwiched between the exposed peaks 507 of the fluted sheet 532 and surface 535 of facer sheet 530.

In this embodiment, each stitch bead is applied as an intermittent bead of adhesive. One benefit of this arrangement is that very limited wasted adhesive is applied between the layers of the filter media. More particularly, adhesive is not unnecessarily applied to surface 535 of the facer sheet 530 between the peaks where the adhesive does not contact any portion of the fluted sheet 532. This limits wasted material as well as prevents unnecessary blocking of the filter media of the facer sheet 530 between the peaks.

As illustrated, the adhesive only slightly interferes with the open flutes 544 formed between adjacent peaks 507 and surface 535 of the facer sheet 530 and to a lesser extent than the prior embodiment. Preferably, the stitch beads 552 fill less than 10% of the cross-sectional area of the open flutes 544 and preferably less than 5% of the cross-sectional area of the open flutes 544. Again, the stitch beads 552 do not block the open flutes formed between the adjacent peaks. The blocking of the open flutes occurs by the application of seal bead 520.

Again, stitch beads can be applied to both sides of the fluted sheet 530. More particularly, stitch beads may be applied between the facer sheet 530 and the fluted sheet 532 during the formation of the layer of fluted filter media. The stitch bead would assist in maintaining the peaks and valleys of the fluted sheet 532 during the formation process. Again, these stitch beads would not block the open flutes formed between adjacent peaks.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of providing reinforcing of a media pack comprising:
   forming a media pack to have an inlet face and an outlet face;
   applying a reinforcing agent to the media pack, the reinforcing agent being applied in a flowable state;
   hardening the reinforcing agent to form a reinforcing structure to reinforce the media pack; and
   wherein the reinforcing agent is impregnated into the media of the filter media pack which forms a substrate, the reinforcing agent extends through the media prior to the step of hardening such that the reinforcing structure is comprised of a matrix of the hardened reinforcing agent and the media substrate.

2. The method of claim 1, wherein the reinforcing agent is applied proximate to at least one of the inlet face and the outlet face.

3. The method of claim 1, wherein the reinforcing agent is a liquid.

4. The method of claim 1, wherein the reinforcing agent is a powder.

5. The method of claim 1, wherein the step of hardening includes exposing the reinforcing agent to a predetermined wavelength of light.

6. The method of claim 5, wherein the predetermined wavelength of light is UV.

7. The method of claim 1, wherein the step of hardening includes heating the reinforcing agent.

8. The method of claim 1, wherein the step of hardening includes actively drying the reinforcing agent.

9. The method of claim 1, wherein the media pack defines an inlet face and an outlet face, the media pack defining a plurality of inlet and outlet flutes extending between the inlet and outlet faces.

10. The method of claim 9, wherein the inlet flutes have an open end proximate the inlet end and a closed end proximate the outlet end and the outlet flutes have a closed end proximate the inlet end and an open end proximate the outlet end, the reinforcing agent does not close the open ends of the flutes.

11. The method of claim 9, wherein the inlet flutes are open proximate the inlet end and closed proximate the outlet end by outlet end sealant and the outlet flutes are closed proximate the inlet end by inlet end sealant and open proximate the outlet end, the reinforcing agent being different than the inlet end sealant and outlet end sealant.

12. The method of claim 11, wherein the inlet and outlet end sealant have a higher viscosity than the reinforcing agent when applied.

13. The method of claim 11, wherein the reinforcing agent overlaps, at least in part, at least one of the inlet end sealant and the outlet end sealant.

14. The method of claim 11, wherein the reinforcing agent is axially located adjacent at least one of the inlet and outlet end sealant.

15. The method of claim 1, further comprising attaching a seal member to the media pack adjacent the reinforcing agent.

16. The method of claim 15, wherein the seal member is molded directly to an outer periphery of the media pack.

17. The method of claim 1, wherein the reinforcing agent is applied to only a portion of the corresponding face.

18. The method of claim 1, wherein the step of applying the reinforcing agent includes coating surfaces of filter media of the media pack with the reinforcing agent.

19. The method of claim 1, wherein applying the reinforcing agent includes spraying the reinforcing agent onto the filter media pack.

20. The method of claim 1, wherein applying the reinforcing agent includes wiping the reinforcing agent onto the filter media pack.

21. A method of providing reinforcing of a media pack comprising:
    forming a media pack to have an inlet face and an outlet face;
    applying a reinforcing agent to the media pack, the reinforcing agent being applied in a flowable state;
    hardening the reinforcing agent to form a reinforcing structure to reinforce the media pack;
    wherein applying the reinforcing agent includes immersing the at least one of the inlet face and the outlet face in the reinforcing agent in a bath of reinforcing agent in the flowable state.

22. The method of claim 21, wherein applying the reinforcing agent includes immersing less than the entire media pack in the reinforcing agent.

23. A method of providing reinforcing of a media pack comprising:
    forming a media pack to have an inlet face and an outlet face;
    applying a reinforcing agent to the media pack, the reinforcing agent being applied in a flowable state;
    hardening the reinforcing agent to form a reinforcing structure to reinforce the media pack;
    attaching a seal member to the media pack adjacent the reinforcing agent; and
    wherein a portion of the seal member overlaps with a portion of the reinforcing agent.

24. A method of providing reinforcing of a media pack comprising:
    forming a media pack to have an inlet face and an outlet face;
    applying a reinforcing agent to the media pack, the reinforcing agent being applied in a flowable state:
    hardening the reinforcing agent to form a reinforcing structure to reinforce the media pack;
    wherein the step of applying the reinforcing agent includes absorbing the reinforcing agent into media of the media pack.

25. A method of providing reinforcing of a media pack comprising:
    forming a media pack to have an inlet face and an outlet face;
    applying a reinforcing agent to the media pack, the reinforcing agent being applied in a flowable state;
    hardening the reinforcing agent to form a reinforcing structure to reinforce the media pack;
    wherein the reinforcing agent extends at least 0.100 inch into the filter media pack from the corresponding face.

26. A method of providing reinforcing of a media pack comprising:
    forming a media pack to have an inlet face and an outlet face;
    applying a reinforcing agent to the media pack, the reinforcing agent being applied in a flowable state;
    hardening the reinforcing agent to form a reinforcing structure to reinforce the media pack;
    wherein hardening the reinforcing agent includes applying a second material to the reinforcing agent to cure the reinforcing agent.

* * * * *